Patented Oct. 1, 1935

2,015,751

UNITED STATES PATENT OFFICE 2,015,751

CATALYTIC PROCESS FOR PRODUCING ALICYCLIC KETONES

George De Witt Graves, Wilmington, Del., assignor to E. I. du Pont de Nemours & Company, Wilmington, Del., a corporation of Delaware No Drawing. Application July 13, 1934,
Serial No. 734,989

18 Claims. (Cl. 260—131)

This invention relates to the process for preparing alicyclic ketones and more particularly it pertains to the preparation of these ketones by oxidizing secondary alicyclic alcohols in the presence of a silver containing catalyst.

This invention has as an object the preparation of alicyclic ketones from the corresponding secondary alicyclic alcohols. Other objects will appear hereinafter.

These objects are accomplished by passing a secondary alicyclic alcohol admixed with the required amount of air or oxygen over a silver containing catalyst. Stoichiometrically the conversion of an alcohol to an aldehyde or ketone is a single dehydrogenation, that is, the removal of a molecule of hydrogen from the alcohol molecule. In this invention the desired dehydrogenation is accomplished by oxidation.

The following examples are given in order to more completely describe this invention:

Example I

Cyclohexanol (hexalin) and air were fed into a preheater at the rate of 0.59 and 1.02 gram moles per minute, respectively, the gram moles of oxygen in this mixture being 0.20. These mixed gases were preheated to a temperature of 315° C. The preheated gases were then passed through a catalyst chamber consisting of a copper tube 1½ inches in diameter by 10 inches long and containing 100 silver gauze disks made from 20x20 mesh gauze. The catalyst chamber was maintained at a temperature of 550 to 575° C. during the reaction. It was found that the reaction was nearly autothermal; that is, the heat of the reaction was nearly sufficient to maintain this converter temperature without the addition of external heat. The reaction products were cooled and upon analysis found to contain cyclohexanone equivalent to 50% conversion of the cyclohexanol charged, unreacted cyclohexanol equivalent to 45% and losses, including gaseous decomposition to CO and $CO_2$, 5%. The crude product was nearly water-white and was entirely free from high-boiling polymerized material.

Example II

Methyl cyclohexanol (mixed ortho and para isomers) and air were fed into a preheater at the rate of 0.42 and 0.7 gram moles per minute, respectively. These mixed vapors were preheated to a temperature of 300° C. The preheated gases were then passed through the catalytic chamber described in Example I, which was maintained at a temperature of 535° C. during the reaction. An analysis of the converter product indicated that 55% of the methyl cyclohexanol had been converted to methyl cyclohexanone, 40% unconverted and 5% lost as $CO_2$, CO, etc.

In place of the secondary alicyclic alcohols shown in the examples, other secondary alicyclic alcohols may be used, for example, menthol to produce menthone, decahydro-beta-naphthol to produce decahydro-beta-naphthone, tetrahydro-beta-naphthol to produce tetrahydro-beta-naphthone, borneol to produce camphor, etc.

The mixture of air and alcohol vapor is preheated to a temperature above the boiling point of the alcohol but substantially below the temperature of the reaction chamber. Preferably the preheating temperature is such that a heat balance is maintained under the conditions of operation and the catalytic reaction is substantially autothermal. For an operation such as that exemplified above, this temperature is about 300 to 315° C. but the most favorable preheating temperature will depend on the heat balance and on the scale of the operation.

In place of air, oxygen or an oxygen and an inert gas mixture may be used. In the preferred conditions for the operation of the process the molar ratio of oxygen to alcohol should be between 0.25 and 0.50.

The temperature in the catalytic chamber during the reaction should be maintained above 450° C. and preferably within the range of 500° to 600° C. The alcohol may or may not contain water, or water vapor may or may not be added to the vapors to be preheated. This modification serves chiefly to provide a better means of controlling the converter temperature.

The catalyst used in the applicant's process should be silver or comprise essentially metallic silver and may be in any form or shape as long as the silver as such will come in contact with the reacting gases.

The applicant's process has certain advantages over the liquid phase catalytic dehydrogenation process for making ketones, which advantages may be enumerated as follows:

(1) The life of the oxidation catalyst is extremely long, consequently catalyst costs are almost inconsequential, (2) The oxidation process gives extremely high space-time yields which are reflected in a corresponding low plant investment per pound of material produced, and (3) The process is nearly autothermal.

The above description and specific examples are illustrative only and are not to be considered as limiting the scope of the invention. Any variation therefrom which conforms to the spirit of the invention is intended to be included within the scope of the claims.

I claim:

1. The process of making alicyclic ketones which comprises passing a gaseous mixture containing a secondary alicyclic alcohol and oxygen over a catalyst comprising essentially metallic silver at a temperature in excess of 450° C.

2. The process of making alicyclic ketones which comprises passing a gaseous mixture containing a secondary alicyclic alcohol and oxygen over a catalyst comprising essentially metallic silver at a temperature of 500 to 600° C.

3. The process of making alicyclic ketones which comprises passing a gaseous mixture of secondary alicyclic alcohol and oxygen, of a molecular ratio of alcohol to oxygen of between 2 and 4, over a catalyst comprising essentially metallic silver at a temperature of 500 to 600° C.

4. The process of making alicyclic ketones which comprises passing a gaseous mixture containing a secondary alicyclic alcohol and air of a molecular ratio of alcohol to oxygen of between 2 and 4 over a catalyst comprising essentially metallic silver at a temperature of 500 to 600° C.

5. The process of making alicyclic ketones which comprises passing a gaseous mixture containing a secondary alicyclic alcohol and oxygen over a catalyst consisting of a multiple number of pieces of silver gauze at a temperature of 500 to 600° C.

6. The process of making alicyclic ketones which comprises passing a gaseous mixture containing a secondary alicyclic alcohol and air of a molecular ratio of alcohol to oxygen of between 2 and 4 over a catalyst consisting of a multiple number of pieces of silver gauze at a temperature of 500 to 600° C.

7. The process of making alicyclic ketones which comprises preheating a mixture of secondary alicyclic alcohol and air and passing said preheated gaseous mixture over a catalyst comprising essentially metallic silver at a temperature of 500 to 600° C.

8. The process of making alicyclic ketones which comprises preheating a mixture of secondary alicyclic alcohol and air to a temperature above the boiling point of the alcohol but substantially below the temperature of the reaction chamber and passing said preheated gaseous mixture over a catalyst comprising essentially metallic silver at a temperature of 500 to 600° C.

9. The process of making alicyclic ketones which comprises preheating a mixture of secondary alicyclic alcohol and air to a temperature such that the catalytic reaction will be substantially autothermal and passing said preheated gaseous mixture over a catalyst comprising essentially metallic silver at a temperature of 500 to 600° C.

10. The process of making alicyclic ketones which comprises preheating a mixture of secondary alicyclic alcohol and air to a temperature of about 300° C. to 315° C., and passing said preheated gaseous mixture over a catalyst comprising essentially metallic silver at a temperature of 500 to 600° C.

11. The process of making alicyclic ketones which comprises preheating a mixture of a secondary alicyclic alcohol and air of a molecular ratio of alcohol to oxygen of between 2 and 4, and passing said preheated gases over a catalyst consisting of a multiple number of pieces of silver gauze at a temperature of 500 to 600° C.

12. The process of making cyclohexanone which comprises passing a gaseous mixture of cyclohexanol and oxygen over a catalyst comprising essentially metallic silver at a temperature of 500 to 600° C.

13. The process of making cyclohexanone which comprises passing a gaseous mixture of cyclohexanol and oxygen over a catalyst consisting of a multiple number of pieces of silver gauze at a temperature of 500 to 600° C.

14. The process of making cyclohexanone which comprises preheating a mixture of cyclohexanol and oxygen and passing said preheated gases over a silver catalyst at a temperature of 500 to 600° C.

15. The process of making cyclohexanone which comprises preheating a mixture of cyclohexanol and air, of a molecular ratio of about 2:1 to a temperature of about 315° C., and passing said preheated gases over a catalyst consisting of a multiple number of pieces of silver gauze at a temperature of 550 to 575° C.

16. The process of making methyl cyclohexanone which comprises passing a mixture of cyclohexanol and oxygen over a catalyst comprising essentially metallic silver at a temperature of 500 to 600° C.

17. The process of making methyl cyclohexanone which comprises preheating a mixture of methyl cyclohexanol and oxygen and passing said preheated gas over a silver catalyst at a temperature of 500 to 600° C.

18. The process of making methyl cyclohexanone which comprises preheating a mixture of methyl cyclohexanol and air of a molecular ratio of about 3:2 to a temperature of about 300° C., and passing said preheated gases over a catalyst consisting of a multiple number of pieces of silver gauze at a temperature of about 535° C.

GEORGE DE WITT GRAVES.